June 21, 1960  E. JABLONSKY  2,941,514
AUXILIARY POWER STEERING FOR MOTOR VEHICLES
Filed May 24, 1957  5 Sheets-Sheet 1

Inventor:
ERICH JABLONSKY
By Albert M Zalkind
ATTORNEY.

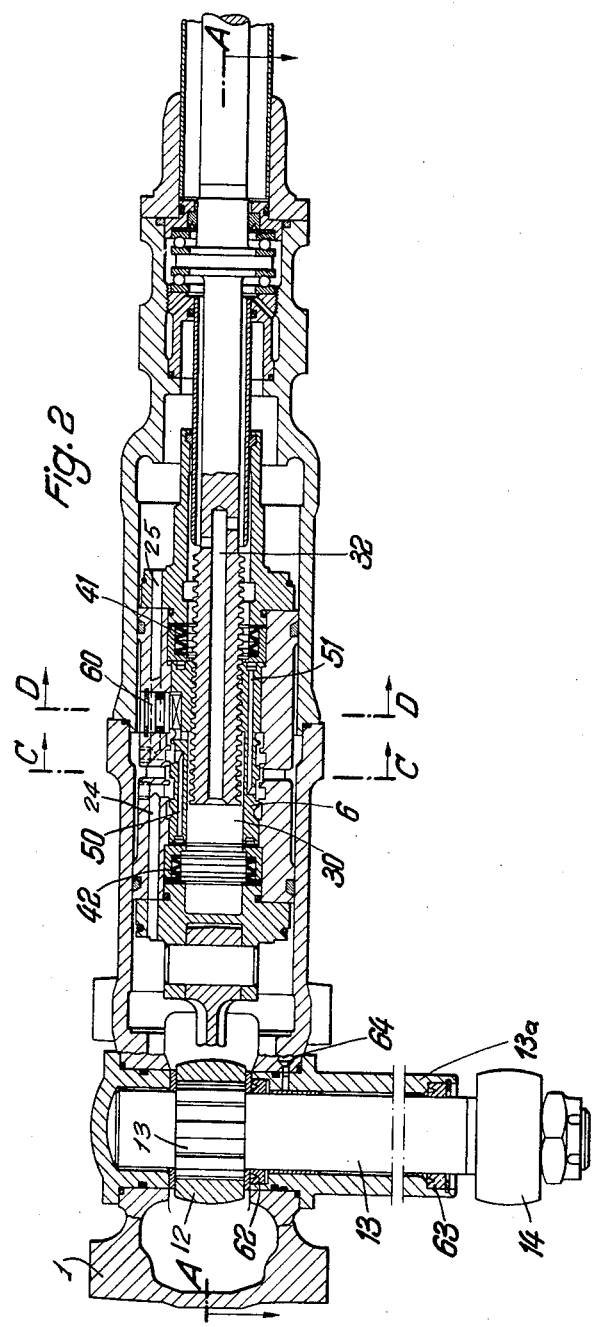

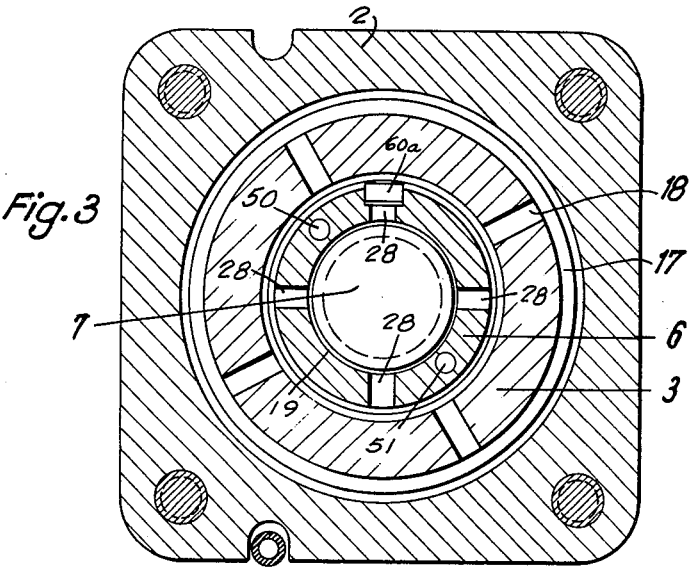
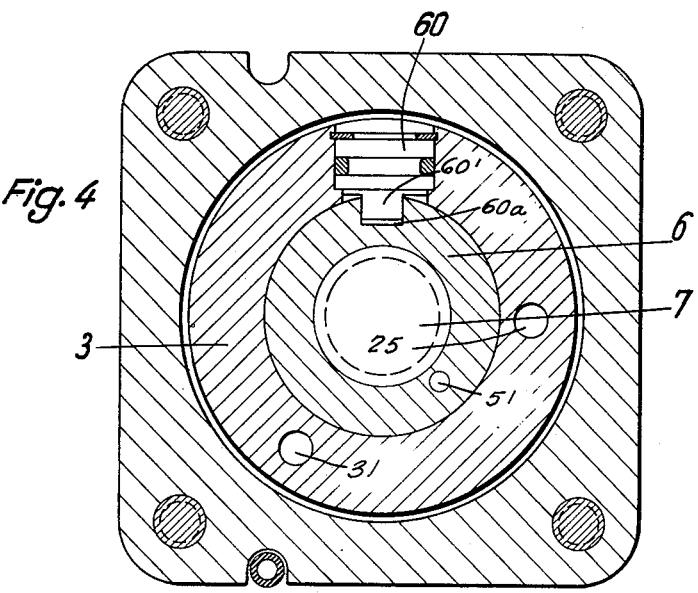

June 21, 1960 E. JABLONSKY 2,941,514
AUXILIARY POWER STEERING FOR MOTOR VEHICLES
Filed May 24, 1957 5 Sheets-Sheet 4

Inventor:
ERICH JABLONSKY
BY [signature]
ATTORNEY

June 21, 1960 E. JABLONSKY 2,941,514
AUXILIARY POWER STEERING FOR MOTOR VEHICLES
Filed May 24, 1957 5 Sheets-Sheet 5

Inventor:
ERICH JABLONSKY
By Albertus Zalkind
ATTORNEY

United States Patent Office

2,941,514
Patented June 21, 1960

1

2,941,514

AUXILIARY POWER STEERING FOR MOTOR VEHICLES

Erich Jablonsky, Schwabisch Gmund, Germany, assignor to Zahnradfabrik Friedrichshafen Aktiengesellschaft, Friedrichshafen am Bodensee, Germany Filed May 24, 1957, Ser. No. 661,357

Claims priority, application Germany May 26, 1956

7 Claims. (Cl. 121—41)

This invention relates to auxiliary power steering and more particularly to power steering effected by oil pressure and controlled by rotation of the steering wheel.

It is an object of the invention to provide a simple, rugged, and easily and economically manufactured auxiliary power steering device.

It is another object of the invention to provide a power steering device having compact construction and a minimum of moving parts.

It is a further object of the invention to provide a power steering device which will provide a reaction to the steering wheel so that the driver can have so-called "road feel."

Other objects and features of the invention will be apparent from the detailed description to follow.

Briefly, my invention comprises a double-ended piston for actuating more or less conventional steering elements wherein the piston has a central passage accommodating a sleeve or spool valve reciprocated manually upon rotation of the vehicle steering post by means of a threaded connection between the lower end of the piston and the valve. Various passages through the valve and the piston are provided to direct pressure fluid selectively to either end of the piston for steering, respectively, in either direction. For purposes of economical manufacture, the piston is sealed within a housing within which it reciprocates by means of resilient O-rings. By a novel construction the valve sleeve is rotated a pre-determined degree in reciprocating in respect to the piston so as to expedite passage of port edges of the piston and the valve with respect to each other, by means of a combined translating and rotating motion, thereby overcoming possible friction of the edges of the piston ports with the edges of the valve ports, as they move into the same plane and beyond. Further, by providing a certain amount of resilient lost motion of the valve with respect to the piston through suitably disposed spring elements, a certain amount of road feel is retained whereby the driver is apprised of resistance to steering but to a considerably lesser degree than would ordinarily be encountered in direct manual steering.

A detailed disclosure will now be given in conjunction with the appended drawing in which:

Fig. 2 is a longitudinal section along the line B—B of Fig. 1 with the valve moved to the right for steering in one direction.

Fig. 3 is a radial section along the line C—C of Fig. 2 to a somewhat larger scale.

Fig. 4 is a radial section along the line D—D of Fig. 2 to a somewhat larger scale.

Figure 1:
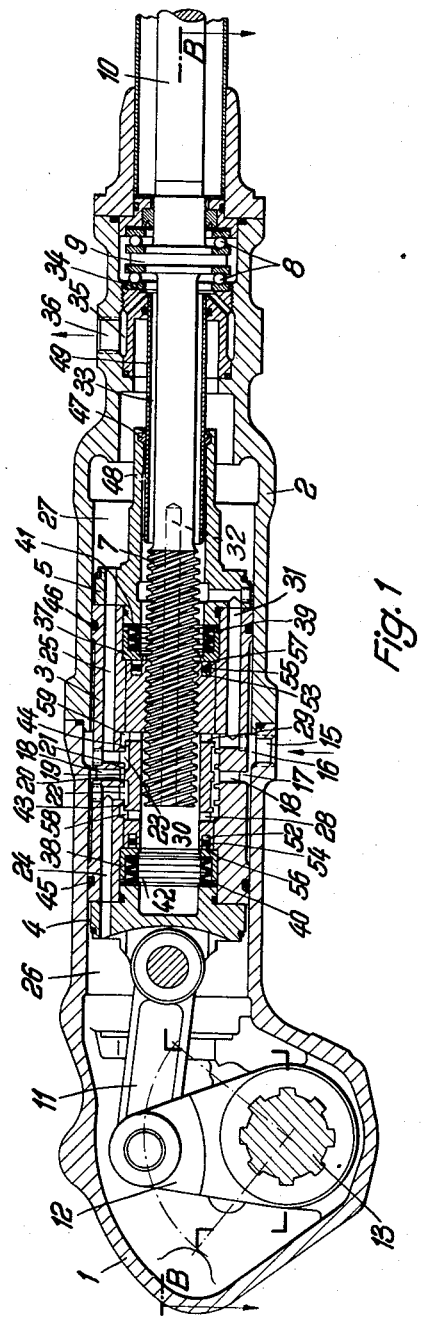
Fig. 1 is a longitudinal section through a steering mechanism of my invention, along the line A—A of Fig. 2, showing a neutral position of the components.

The invention comprises a housing having a lower casing portion 1 and an upper casing portion 2 which are generally of cylindrical shape. Within the housing is a piston comprised of a cylindrical central component 3 and having a piston head 4 in a pressure chamber 26 at what will be understood to be the lower end of the construction, and a piston head 5, in a pressure chamber 27 at what will be considered to be the upper end of the construction. The piston head 4 is suitably linked through an arm 11 to a bell crank 12 which in turn rocks a steering shaft 13 which will be understood to be suitably connected to the usual rods which effect steering of the vehicle wheels, depending upon the direction of rotation of shaft 13, the connections to the wheels being not disclosed since they do not form part of the present invention. Within the piston there is disposed a spool or sleeve valve 6 having an internal thread as shown engaged by the lower end of a steering rod 10 which is supported in bearings 8 spaced by means of a collar 9. It will be understood that the steering rod 10 extends upwardly and has a steering wheel affixed at its outer end in a well known manner.

In order to simplify assembly of the casing, the bell crank 12 is a separate piece from the steering shaft 13 whereby the casing portion 1 may be manufactured in a single piece so as to serve more effectively as a pressure chamber 26 which is sealed by means of a sealing ring 62 (Fig. 2). A second sealing ring 63 prevents any leakage of oil which might possibly pass the ring 62, which leakage would be returned through a bore 64 which connects to a return oil port 36 (Fig. 1).

Thus, in comparing Figs. 1 and 2, it will be noted that the steering shaft 13 is carried in a housing 13a having suitable bearing support at each end of the housing 13a which housing carries the sealing rings 62 and 63, and which housing will be understood to be made in two pieces and inserted into suitable bores provided in the casing component 1. The outer end of shaft 13 is provided with steering rod lever 14 which, as will be understood, actuates the steering mechanism.

The device is constructed for constant flow from the pump (not shown) through the inlet port 15 and returned through the outlet port 36. This constant flow occurs in neutral position and at a pressure sufficient to overcome the retarding effect of fluid friction in the various channels of the valve and piston.

Figure 8:
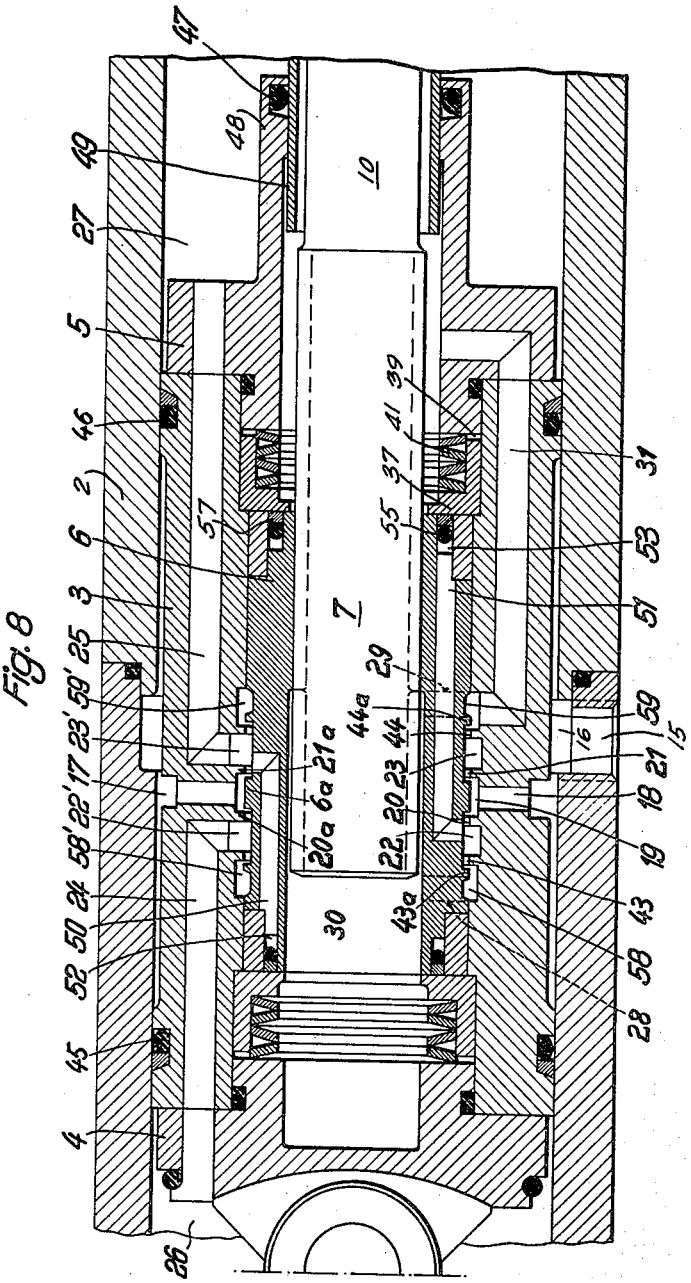
Fig. 8 is an enlarged view of a portion of Fig. 1.

In neutral position oil passage is from inlet port 15 around an internal annular groove 16 in the casing and thence to an external annular groove 17 in the piston portion 3 which connects with a series of angularly spaced radial ports 18 (Fig. 3). Oil from the ports 18 flows into an internal annular groove 19 of the piston (Fig. 3) and thence through restrictive annular clearances 20 and 21 which are effected by ridges, respectively, 20a and 21a in the piston and a ridge 6a on the valve (Fig. 8). (Either clearance can be closed by respective movement of the valve to right or left.) From clearances 20 and 21 oil flows into annular channels 22 and 23 and thence thru bores 24 and 25 into the respective pressure chambers 26 and 27 at the ends of the piston.

In neutral position oil also flows via the channels 22 and 23 through restrictive peripheral clearances 43 and 44 formed by ridges 43a and 44a coacting with the ridged sides of an internal piston groove 22′ which clearances control the flow in a manner similar to the restrictive clearances 20 and 21, and thence into outlet annular grooves 58 and 59 (Fig. 8) and thence through bores 28 and 29 into a central chamber 30. The central chamber 30 is connected via channels 31, 32, 33, 34, and 35 with the outlet port 36, as will be noted by comparing Figures 1, 2 and 8.

It will be noted that valve channels 19, 22, 23, 53 and 59 have corresponding piston channels 22', 23', 58' and 59'.

The valve sleeve 6 is held in neutral or central position by spring washer sets 41 and 42 which are carried in respective sockets 37 and 38. The centering of the valve is required for the reason that, during return movement of the steering wheel, namely, when the steering wheel has no manual force applied thereto, the valve must be in neutral position. The movable socket elements 37 and 38 (Fig. 8) are provided with a pre-determined degree of axial lost motion as indicated by the respective clearances 39 and 40, prior to abutment of the socket elements with respective inner faces of the piston heads. This lost motion permits oil pressure control for power steering; direct abutment of either socket element with a respective piston head effects manual steering. The primary function of the sets of spring washers is to keep the valve centered with respect to the piston when steering is not being effected so that oil flows from the inlet to the outlet without effecting movement of the piston. In power steering, the piston follows the valve and there is no abutment of either socket with its piston head.

In power steering with sleeve valve 6 moving toward the right (Fig. 8) the restrictive clearances 21 and 43 are closed. Oil is then conducted from the inlet around the annular groove 19 into the annular groove 22 and thence through bore hole 24 into pressure chamber 26 where pressure is built up due to blocking of oil flow and the piston is moved to the right to follow the movement of the valve 6. If the steering wheel is relieved of manual torque or if the rate of motion of the piston is greater than that of the valve the restrictive clearances 21 and 43 are opened to restore the neutral oil flow whereby movement of the piston is stopped.

Oil in the chamber 27 must have access to outlet port 36 when the piston is moved to the right as viewed in Fig. 1. This is effected through the bore 25 and the annular spacings 23, 59, bore 31, spacing 33 and bores 35, 36.

When the valve 6 is moved to the left oil is directed toward the other side of the piston in the same manner, passage through the spacings 20 and 44 being then blocked so that pressure can build up in chamber 27. Return oil from chamber 26 then takes place via bore 24, annular spacings 22, 58, bores 28, 29, annular spacing 59, bore 31, spacing 33 and bores 35, 36.

O-rings 45, 46, and 47 are provided to separate the housing into the separate pressure chambers 26 and 27 so that either of these chambers may have oil under high pressure when required. The piston head 5 has a tubular extension 48 concentrically disposed around a sleeve 49, which sleeve is sealingly engaged by the O-ring 47. Accordingly, the piston heads are of unequal size. This, however, has no disturbing effect because the pump always adapts the pressure to the power needed at any one time. A different piston pressure will occur as a result of maximum pump pressure only in the end positions; this effect, however, is not of great importance.

The O-ring 47 is mounted on sleeve 49 so that it is not subjected to rotative forces which would impede rotation of steering rod 10 and would require pre-loading of spring sets 41 and 42 in order to provide return movement of the valve to central position.

Compensation for the inequality of the piston head areas so that steering force will feel equal for either direction of turn is accomplished in a manner to be later described.

Further, due to the pressure on both ends of the piston in neutral position and the inequality of piston head areas, the piston would ordinarily have a tendency to move to the right i.e., upward, it being understood that the piston is inclined anywhere from 30° to 90° from the horizontal. This force upwards is counteracted by the weight of the piston.

In order to impart "steering feel," the valve is provided with annular channels 52 and 53 connected with respective pressure chambers 26 and 27 via respective bores 50 and 51. Gaskets 54 and 55 slidably seal respective channels, retained by respective slidable rings 56 and 57.

Channel 22 communicates with either bore 50 or 51 when the valve is moved to left or right respectively. Thus pressure from either chamber 26 or 27 is led to channel 52 or 53, respectively to exert a reaction pressure force on the valve sleeve in a respective direction which is opposite to the axial force exerted by rotating the steering rod 10.

Accordingly, rotation of the steering wheel encounters a pre-determined degree of resistance in reciprocating the valve sleeve.

In order to compensate for the unequal piston head areas, so that manual steering resistance will feel the same in turning in either direction, the areas of channels 52 and 53 are made unequal in inverse proportion to the inequality of the piston heads so that wheel resistance is balanced. Thus the effective pressure area of channel 53 is somewhat larger than that of channel 52.

Referring to Fig. 4, in rotating the steering rod 10, rotation of the valve sleeve 6 may be prevented by a tongue or pin 60 carried by the piston 3 which protrudes into a groove or slot 60a of the valve sleeve, the key has a longitudinal slidable fit in the groove.

Figure 5:
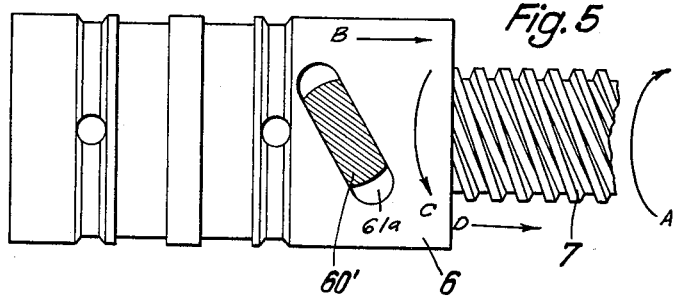
Fig. 5 is a plan view of the valve showing certain elements for the purpose of imparting partial rotation during reciprocal movement.

Referring to Fig. 5, a somewhat different arrangement is shown which permits slight rotation of the valve sleeve in order to augment axial motion. In this instance, the slot 61a in the sleeve is slanted with respect to the rotary axis of the sleeve.

Thus, as seen on Fig. 5, if rotation of the steering rod threaded portion 7 is clockwise as indicated by the arrow A, the complementary internally threaded valve sleeve 6 will move in the direction B. However, in moving in the direction B it exerts a force against the fixed tongue or pin 60' which results in a counterclockwise motion as indicated by the arrow C. This rotation in the direction of the arrow C, due to the slanting of the slot 61a, moves the nut 6 axially in the direction of the arrow D, that is, in the same direction as the arrow B. Thus, the axial motion of the nut 6 is amplified.

The slant of slot 61a serves as a second thread to increase the rate of the longitudinal motion of the sleeve valve to make control of the valve more sensitive, and the pitch of the slot is preferably greater than the pitch of the threaded portion 7 of the steering rod.

Figure 6:
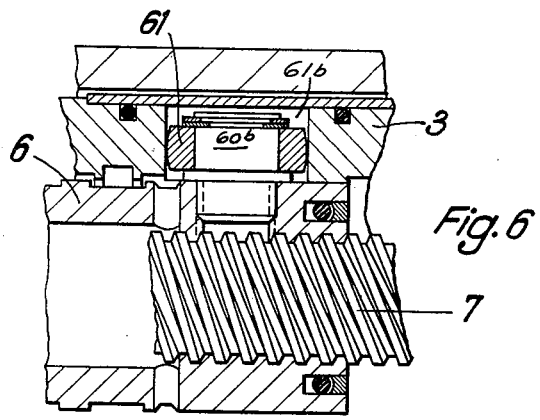
Fig. 6 is a longitudinal fragmentary section showing the arrangement of certain elements for imparting partial rotation of the valve.
Figure 7:
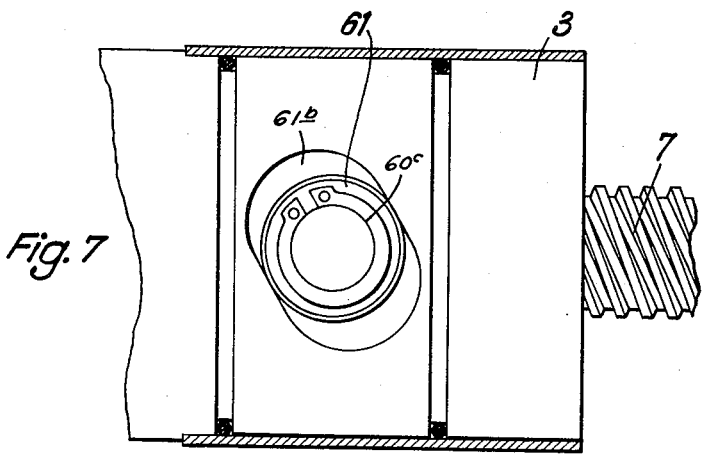
Fig. 7 is a plan view showing the diagonal slot in the piston for effecting partial rotation.

A better arrangement, and one which increases the rate of reciprocation of the valve is as shown in Figures 5, 6, 7, wherein a pin 60" is threaded as shown into the valve sleeve 6 and carries a roller 61 in an oblique cam slot 61b of the piston 3. The roller is retained by horseshoe clip 60c snapped on to a cylindrical extension 60b of the pin as shown. The roller arrangement materially reduces friction in the mechanism, although the forces acting are substantially the same in order to produce the increased travel of the sleeve valve, the preferred arrangement of Fig. 6 being substantially a reversal of parts of the arrangement shown in Fig. 5 in that tongue 60' is secured to the piston in the form shown in Figs. 4 and 5, while the equivalent roller 61 is secured to the sleeve valve in the form shown in Figs. 6 and 7.

Having thus disclosed my invention, I am aware that various changes may be made without departing from

I claim:

1. An auxiliary power steering device for motor vehicles comprising a housing, defining two pressure chambers, a reciprocal double face piston in said housing, each face being in a respective pressure chamber, a movable sleeve valve in said piston, a manually rotative steering rod operatively connected to said valve to effect movement of said valve relative to said piston upon rotation of said steering rod, said valve having flow passages, said piston having flow passages registerable with said valve flow passages to direct pressure fluid to a selected face of said piston to effect movement of said piston in a selected direction, and means operative by motion of said piston to effect steering, said valve and rod being threadedly connected, and means for limiting rotation of said valve whereby rotation of said steering rod effects axial movement of said valve to effect alinement of a pre-determined flow passage of said valve with a flow passage of said piston in either direction of rotation of said steering rod to direct flow to a respective face of said piston so as to move said piston axially by fluid pressure to follow the axial motion of said valve, said means for limiting rotation of said valve comprising a cam slot in said valve and a cam element carried by said piston and protruding into said cam slot, said cam slot being disposed obliquely to augment the axial motion of said valve upon rotation of said steering rod, said cam element having relative sliding abutment with said cam slot.

2. An auxiliary power steering device for motor vehicles comprising a housing, defining two pressure chambers, a reciprocal double face piston in said housing, each face being in a respective pressure chamber, a movable sleeve valve in said piston, a manually rotative steering rod operatively connected to said valve to effect movement of said valve relative to said piston upon rotation of said steering rod, said valve having flow passages, said piston having flow passages registerable with said valve flow passages to direct pressure fluid to a selected face of said piston to effect movement of said piston in a selected direction, and means operative by motion of said piston to effect steering, said valve and rod being threadedly connected, and means for limiting rotation of said valve whereby rotation of said steering rod effects axial movement of said valve to effect alinement of a pre-determined flow passage of said valve with a flow passage of said piston in either direction of rotation of said steering rod to direct flow to a respective face of said piston so as to move said piston axially by fluid pressure to follow the axial motion of said valve, means for sealing said valve within said piston comprising a tubular extension on said piston, a tubular extension carried by said housing and extending relatively reciprocally into the tubular extension of said piston, and a sealing ring intermediate said extensions, said extension carried by said housing having radial spacing relative to said steering rod to effect communication with said valve.

3. In a device as set forth in claim 2, said extensions co-acting to achieve unequal effective pressure areas of said piston faces.

4. In a device as set forth in claim 3, including compensating means to effect equal steering resistance in either direction of rotation of said rod comprising pressure chambers within said piston, said valve having faces subjected to pressures of the respective chambers, said faces having unequal effective pressure areas inversely proportional to the inequality of the effective pressure areas of said piston faces.

5. In a device of the class described, a housing defining a pair of pressure chambers, a reciprocal, double-faced piston element in said housing, each face being in a respective pressure chamber, a movable sleeve valve element in said piston element, a manually rotative steering rod threadedly connected to said valve element to effect reciprocation thereof with respect to said piston element, said valve element and piston element having co-acting passages to control flow of a pressure fluid to the faces of said piston element upon movement of said valve element by rotation of said steering rod, and cam means connecting said valve element and piston element for effecting a predetermined rotation of said valve element upon axial force being exerted thereon when said steering rod is rotated to augment axial movement of said valve element in the direction of axial movement effected by rotation of said steering rod.

6. In a device as set forth in claim 5, said cam means comprising a tongue carried by one of said elements and protruding into a slot in the other of said elements, said slot being disposed obliquely to the axis of said steering rod, the axis of said slot having a larger pitch than the pitch of the thread connecting said steering rod to said valve element.

7. In a device as set forth in claim 5, said cam means comprising a roller carried by said valve element and a slot in said piston element in which said roller is disposed, said slot having an axis oblique to the axis of the steering rod.

References Cited in the file of this patent

UNITED STATES PATENTS

| 1,790,620 | Davis | Jan. 27, 1931 |
| 1,937,470 | Davis | Nov. 28, 1933 |
| 1,937,485 | Davis | Nov. 28, 1933 |
| 1,959,177 | Sassen | May 15, 1934 |
| 2,220,339 | Leathem | Nov. 5, 1940 |
| 2,334,918 | French | Nov. 23, 1943 |
| 2,722,199 | Blanchette et al. | Nov. 1, 1955 |
| 2,755,778 | Looflourrow et al. | July 24, 1956 |
| 2,788,770 | Folkerts | Apr. 16, 1957 |
| 2,828,721 | Folkerts | Apr. 1, 1958 |

FOREIGN PATENTS

| 354,327 | Great Britain | Aug. 4, 1931 |
| 618,457 | Great Britain | Feb. 22, 1949 |